May 21, 1935.   J. R. McWANE   2,002,122
METHOD OF FORMING METAL FORTIFIED PACKER GASKETS
Filed May 25, 1933   4 Sheets-Sheet 1
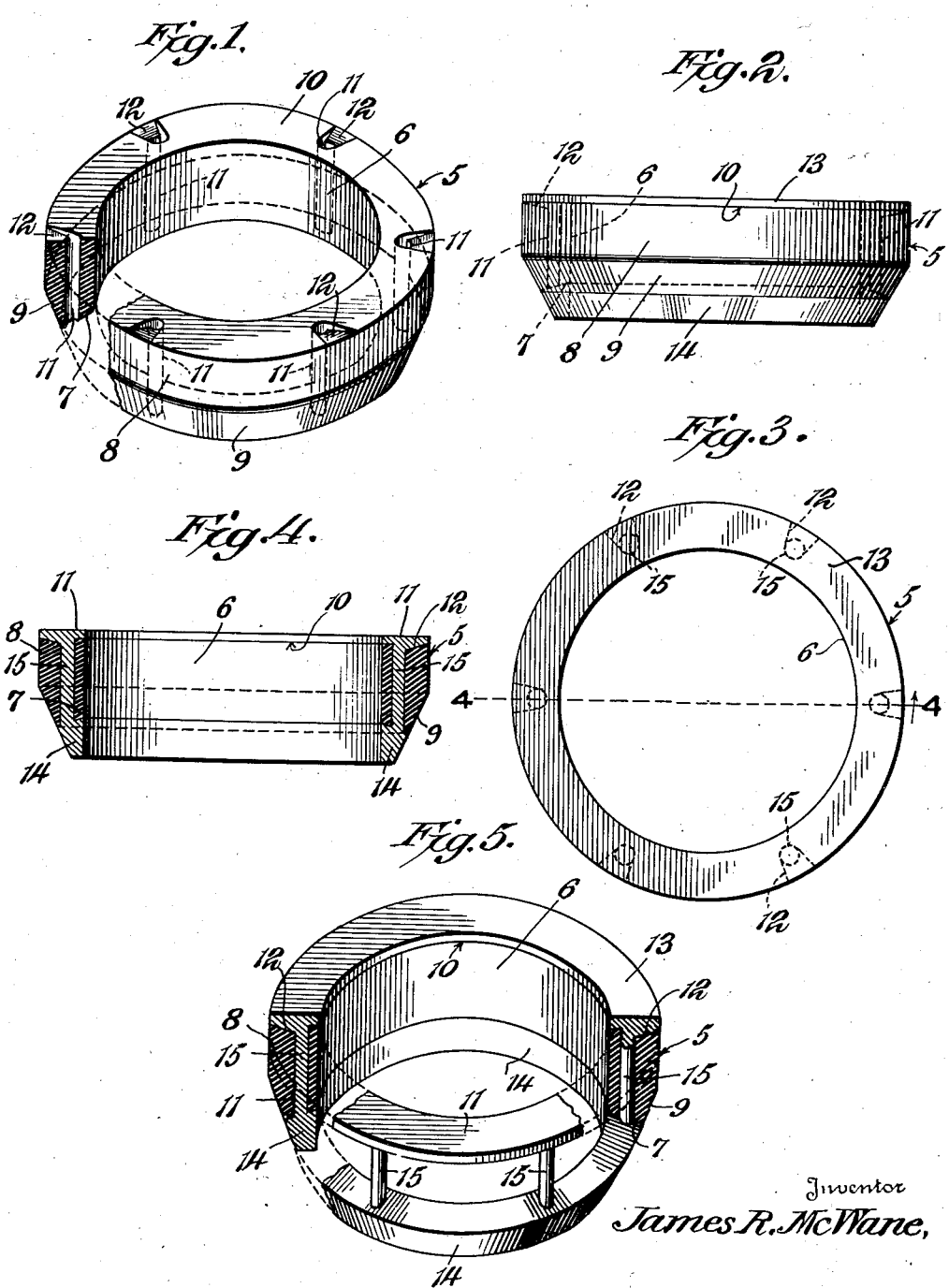
Inventor
James R. McWane,
By S. George Tate
Attorney May 21, 1935.   J. R. McWANE   2,002,122
METHOD OF FORMING METAL FORTIFIED PACKER GASKETS
Filed May 25, 1933   4 Sheets-Sheet 2
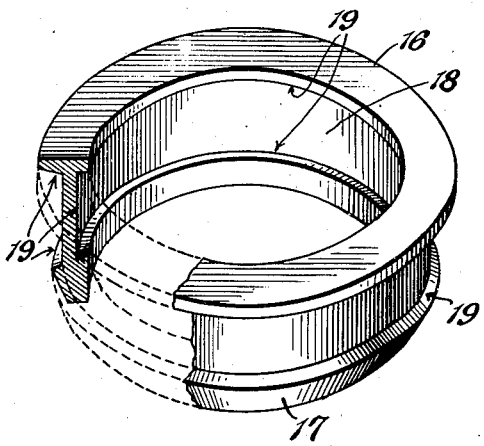
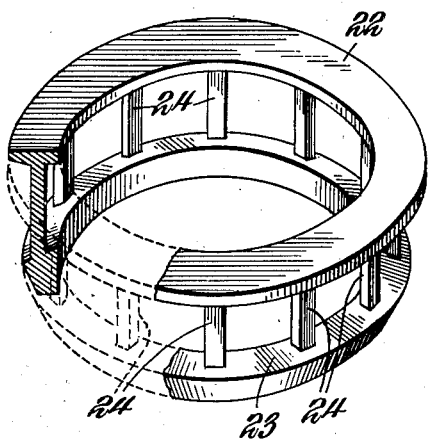
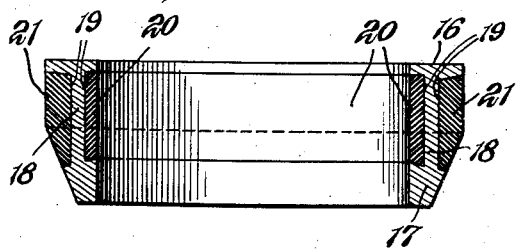
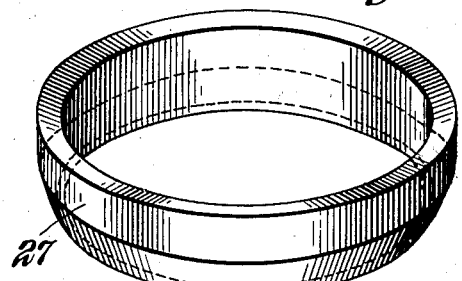
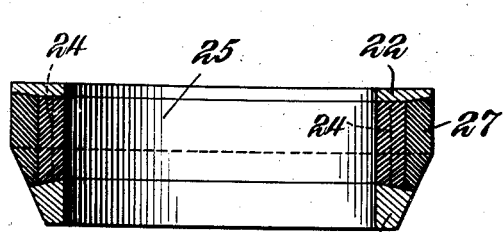
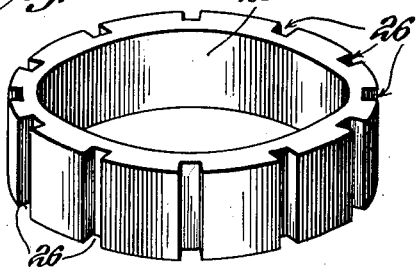
Inventor
James R. McWane,
By S. George Tate
Attorney May 21, 1935.  J. R. McWANE  2,002,122
METHOD OF FORMING METAL FORTIFIED PACKER GASKETS
Filed May 25, 1933  4 Sheets-Sheet 3
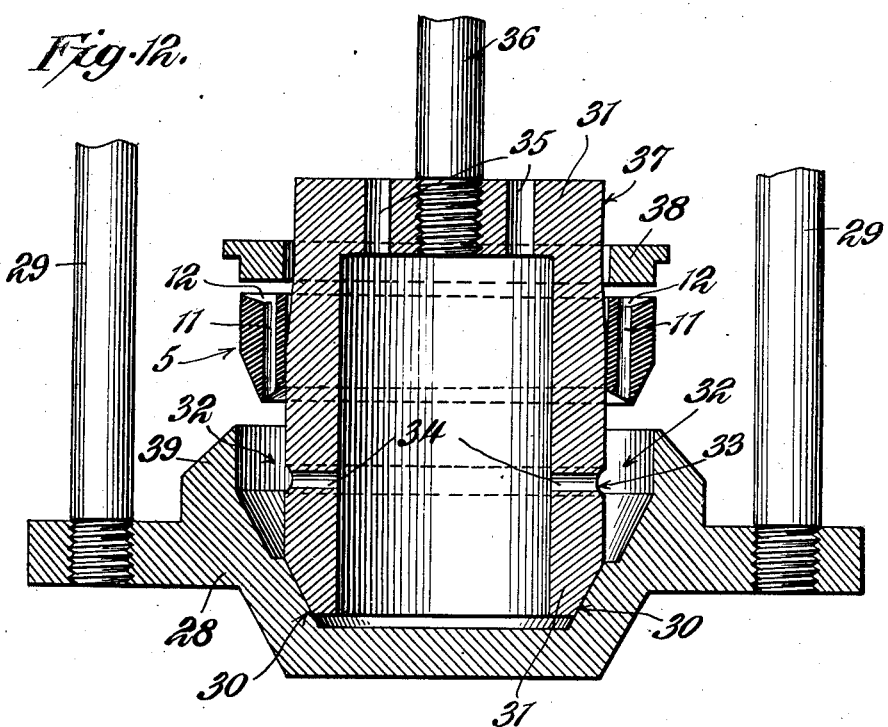
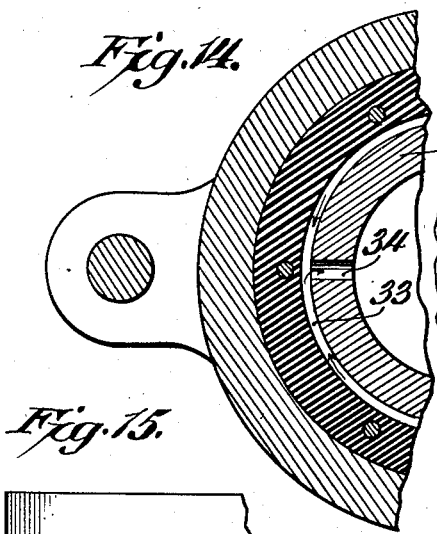
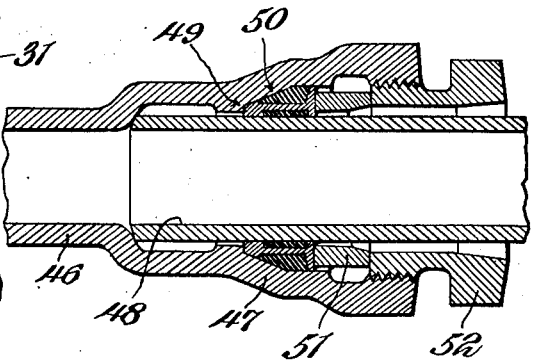
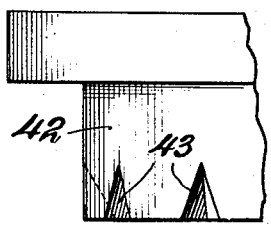
Inventor
James R. McWane.
By S. George Tate
Attorney

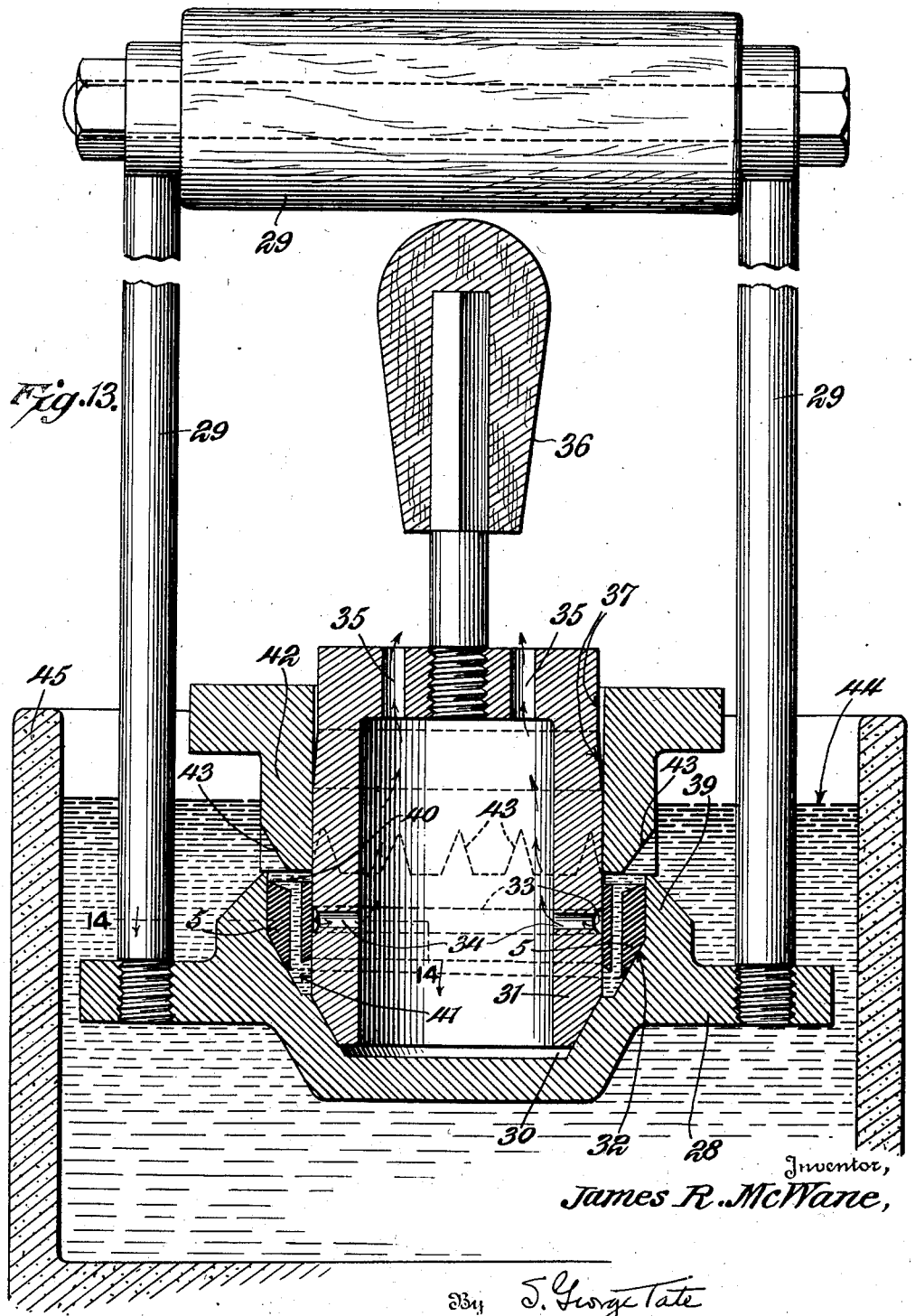

Patented May 21, 1935

2,002,122

UNITED STATES PATENT OFFICE 2,002,122

METHOD OF FORMING METAL FORTIFIED PACKER GASKETS

James R. McWane, Birmingham, Ala.; A. T. McWane, William McWane and Jelks H. Cabaniss, executors of said James R. McWane, deceased, assignors to McWane Cast Iron Pipe Co., Birmingham, Ala.

Application May 25, 1933, Serial No. 672,886

2 Claims. (Cl. 22—202)

The invention relates to packer gaskets of the type employed in bell and spigot or similar forms of pipe joints for sealing the joints against leakage.

In pipe joints of the bell and spigot and like types, gaskets commonly are employed to seal the joints against leakage. These gaskets are formed of compressible material, usually rubber, and it has been found that when allowed to contact with certain materials which the pipe lines convey the rubber forming or employed in the gaskets deteriorates and swells or becomes otherwise deformed and unfit for continued efficient use.

In its more detailed nature therefore, my invention seeks to provide a novel form of gasket including a body of rubber or similar compressible material suitably fortified at its respective ends with metallic portions capable of supporting the compressible body and cooperating therewith in effecting an efficient joint seal and of protecting said body against destructive deterioration.

Another object of the invention is to provide a new and improved method of forming the gasket.

With these and other objects in view which will more fully appear, the nature of the invention will be more clearly understood by following the description, the appended claims, and the several views illustrated in the accompanying drawings.

In the drawings:—

Figure 1 is a perspective view illustrating the compressible body portion of my improved gasket.

Figure 2 is a side elevation illustrating my improved gasket in its complete form.

Figure 3 is a plan view of the gasket shown in Figure 2.

Figure 4 is a vertical cross section taken on the line 4—4 on Figure 3.

Figure 5 is a sectional perspective view illustrating the gasket shown in Figures 2, 3 and 4, parts being broken away.

Figure 6 is a sectional perspective view illustrating the metal portion of a modified form of gasket.

Figure 7 is a vertical cross section of a complete gasket embodying the metal portion shown in Figure 6.

Figure 8 is a sectional perspective view illustrating the metal portion of another modified form of gasket.

Figures 9 and 10 are perspective views illustrating the rings of compressible material which cooperate with the metal portion of Figure 8 to form the complete modified form of gasket.

Figure 11 is a vertical cross section formed compositely of the parts shown in Figures 8, 9 and 10.

Figure 12 is a detail central vertical section illustrating application of the compressible body ring to the mold parts.

Figure 13 is a central vertical section illustrating the molding of the metal portion of the gasket shown in Figures 1 to 5.

Figure 14 is a detail horizontal section taken on the line 14—14 on Figure 13.

Figure 15 is a fragmentary side elevation of the mold cavity closing gland ring shown in Figure 13.

Figure 16 is a detail longitudinal section of a bell and spigot type pipe joint in which a gasket embodying the invention is applied.

In Figures 1 to 5 of the drawings, I have illustrated one form of my improved gasket in which is embodied an annulus formed of a suitable compressible material, such as rubber, and generally designated 5. This ring or annulus may be formed in any approved manner but in this particular form of the invention it comprises a solid ring comprising an inner cylindrical surface 6 which merges with or terminates in a flared frusto-coniform surface 7, and an outer cylindrical surface 8 which merges with or terminates in a tapered or frusto-coniform surface 9. The frusto-coniform surfaces 7 and 9 are reversely directed and together form a resultant wedge-shaped nose or toe portion as illustrated in Figure 1 of the drawings.

At its end opposite the wedge-shaped nose or toe portion, the annulus 5 terminates in a transverse wall or heel surface 10 lying in a plane normal to the axis of said annulus. The heel surface 10 and the nose surface 7 both constitute substantially transverse surfaces but it is preferable that the surface 10 should lie in a plane normal to the annulus axis while the surface 7 bears angular relation to the axis for a purpose which will become apparent as the description progresses. At equidistantly spaced intervals the annulus 5 is provided with a plurality of chambers or bores 11 which communicate through both of the annulus end surfaces 10 and 7 and, where they pass through the surface 10 the bores, preferably are provided with funnel-like flow directing recesses 12. The purpose of the recesses 12 likewise will become apparent as the description progresses. The resilient or compressible annulus constructed as above described, in the completed form of the gasket, has its respective ends protected by soft metal rings. The annulus surface 10 is abutted by a heel or cap ring 13 and the annulus surface 7 is opposed by a nose or toe ring 14, said rings preferably being cast integrally with and connected by equidistantly spaced lugs 15 which are positioned in the bores 11 referred to hereinbefore.

It will be obvious by reference to Figures 1, 2 and 3 of the drawings that the outer faces of the annulus 5 and the ring 14 are so shaped that they conjointly form a tapered or frusto-coniform surface of the completed gasket.

In Figures 6 and 7 of the drawings, I have disclosed a modified form of gasket in which the heel or cap ring 16 and the nose or toe ring 17, both shaped substantially as in the form previously described, are joined with a thin annular wall 18. The wall 18 serves to provide ring seats or recesses 19 (see Figure 6) at the inner and outer or opposite sides thereof into which inner and outer rings 20, 21 of yieldable or resilient material such as rubber may be applied as illustrated in Figure 7 of the drawings.

In Figures 8 to 11 of the drawings, I have disclosed another form of the gasket in which the thin annular wall, instead of being continuous, is formed by a plurality of equidistantly spaced ring connecting lugs. In this form of the invention the heel or cap ring 22 and the nose or toe ring 23, both shaped substantially as shown in Figures 1 to 5, are joined by the thin annular wall of spaced lugs designated 24. Into the annular seats or recesses formed at the opposite sides of the wall of lugs are fitted inner and outer rings of rubber or other suitable yieldable gasket material as in the form of the invention shown in Figures 6 and 7. In this form of the invention, however, the inner ring 25 preferably is formed with a peripheral surface notched as at 26 (see Figure 10) so as to provide projections which will extend between the connecting lugs 24 and engage the opposed surface of the outer ring 27 as illustrated in Figure 11 of the drawings.

Except for the internal construction provided by the annular continuous wall 18 and the annular wall formed of spaced lugs 24, and the provision of individual inlay rings of rubber, the gaskets disclosed respectively in Figures 6 and 7 and in Figures 8 to 11 are shaped and function the same as the gaskets disclosed in Figures 1 to 5.

My invention also comprehends a novel method of forming the gasket shown in Figures 1 to 5 of the drawings. In practice, in my improved method, I employ a mold base 28 to which a bail-like handle equipment 29 is secured in order to facilitate handling thereof. The base includes a frusto-coniform seat or recess 30 to receive the tapered end of a hollow cylindrical mold wall forming member 31, and a surrounding cavity 32 which cooperates with the member 31 in forming an annular chamber or cavity having the same cross-sectional shape as the completed gasket. See Figures 12 and 13.

The member 31 is equipped with an annular air escape channel 33 which may communicate with atmosphere through radial openings 34 formed in the walls of the member 31, through the hollow interior of said member, and through openings 35 formed in the end wall of said member as illustrated in Figures 12 and 13. The mold member 31 may also be provided with a handle 36 to facilitate manipulation thereof.

In the formation of my improved gasket, the body ring or annulus 5, of rubber or other compressible material illustrated in Figure 1 of the drawings, is applied to the mold member 31 as illustrated in Figure 12 of the drawings, and for this purpose the member 31 may be reduced in diameter at its receiving end as illustrated at 37. A follower ring 38 may be utilized to force the annulus 5 down into the cavity 32 to the position illustrated in Figure 13.

It will be observed that the upstanding annular flange 39 which defines the outer limits of the cavity 32 is deep enough so that clearance spaces or chambers are provided beneath and above the annulus 5 as shown in Figure 13. The clearances below and above the annulus 5 are of the same cross-sectional area or shape as the heel and toe or nose rings. The clearance or space designed to provide the heel ring is generally designated 40 and the clearance or space designed to form the toe or nose ring is generally designated 41.

After the ring or annulus 5 has been applied, the follower ring 38 is removed and a gland ring 42 substituted therefor. The closure ring 42 is shown in Figures 13 and 15 of the drawings and is so proportioned that its lower end will form a closure for the casting cavity 32. The outer edge of the closure forming end of the gland ring is provided with a plurality of flow notches 43, the purpose of which will become apparent as the description progresses. At this point the molding or casting parts are immersed in a bath 44 of molten metal (lead) contained in a suitable container 45. The molten metal flowing into the casting cavity 32 through the clearance ring notches 43 will quickly fill the clearance or chamber 40 and pass downwardly through the funnel-like recesses 12 and bores 11 into the lower clearance or chamber 41. After the metal is permitted to cool and harden the completed gasket shown in Figures 2 and 3 of the drawings may be removed from the casting mold.

It will be obvious that as the mold is lifted out of the molten bath 44, excess of the molten metal will overflow the upper edge of the confining wall 39 and thus determine the upper limit and therefore the length of the gasket without necessitating the resorting to any excess metal trimming action.

While it is preferred that in the gaskets shown in Figures 6 and 7 and in Figures 8 to 11 the metal portions of the gaskets be preformed and the rubber rings snapped into place in the recesses provided therefor, it will be obvious that these gaskets likewise may be formed by positioning the rubber rings and thereafter casting the metal portions.

In Figure 16 of the drawings, I have illustrated a pipe joint in which one of my improved gaskets is applied. In this disclosure, the conventional pipe 46 and its bell 47 receive the usual spigot 48, said bell being constructed to provide the usual gasket seat 49 and flared receiving chamber 50. When the gasket is inserted into the receiving chamber, a follower ring 51 is applied thereagainst so that when the threaded nipple 52 is screwed home, the gasket will be forced into tight sealing contact with the bell and spigot surfaces. Preferably the metal connecting means which connect the heel and toe or nose ring portions of the gasket are deformable so that when the follower ring 51 is forced tightly against the heel ring, said connectors may be slightly deformed to compress and expand the rubber body portions of the gasket. The abutting frusto-coniform surfaces of the rubber body and the toe or nose ring likewise facilitate in directing the rubber body portions into sealing contact with the joint walls.

It is of course to be understood that the details of structure and arrangement of parts may be variously changed and modified without departing from the spirit and scope of my invention.

I claim:—

1. The method of forming a pipe joint gasket having soft metal ends and an intermediate body of compressible sealing material which consists in forming an annulus of the compressible material with chambering in the annulus body thereof opening communication therethrough from end to end, confining the annulus with its axis disposed vertically in an annular cavity affording clearance above and below the annulus to the extent of the desired proportions of soft metal ends and defined by bottom and lateral confining walls one of which lateral walls terminates at a height for determining the extent of the above clearance, administering molten metal to the above clearance and through the chambering of the annulus into the lower clearance to be allowed to thereafter harden and be removed from the confinement with the annulus as an integral gasket structure, and permitting said molten metal to overflow said upper clearance extent determining wall for fixing the length of the gasket without resort to trimming of excess metal.

2. The method of forming a pipe joint gasket having soft metal ends and an intermediate body of compressible sealing material which consists in forming an annulus of the compressible material with chambering in the annulus body thereof opening communication therethrough from end to end, confining the annulus with its axis disposed vertically in an annular cavity affording clearance above and below the annulus to the extent of the desired proportions of soft metal ends and defined by bottom and lateral confining walls one of which lateral walls terminates at a height for determining the extent of the above clearance, administering molten metal into said clearances and chambering to be allowed to thereafter harden and be removed from the confinement in the annular cavity as an integral gasket structure, and permitting said molten metal to overflow said upper clearance extent determining wall for fixing the length of the gasket without resort to trimming of excess metal.

JAMES R. McWANE.